(12) United States Patent (10) Patent No.: US 12,368,235 B2
Robinson et al. (45) Date of Patent: *Jul. 22, 2025

(54) ULTRA-LOW COST HIGH PERFORMANCE SATELLITE APERTURE

(71) Applicant: Viasat, Inc., Carlsbad, CA (US)

(72) Inventors: Parker A. Robinson, Ocala, FL (US); David J. Trusheim, Poway, CA (US); Michael T. Kretsch, San Diego, CA (US); Jonathan D. Maier, San Marcos, CA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,707

(22) Filed: May 20, 2024

(65) Prior Publication Data

US 2024/0356205 A1 Oct. 24, 2024

Related U.S. Application Data

(63) Continuation of application No. 17/429,275, filed as application No. PCT/US2020/017847 on Feb. 12, 2020, now Pat. No. 12,027,760.

(Continued)

(51) Int. Cl.
*H01Q 1/28* (2006.01)
*H01Q 19/17* (2006.01)
*H04B 7/08* (2006.01)

(52) U.S. Cl.
CPC ............ *H01Q 1/288* (2013.01); *H01Q 19/17* (2013.01); *H04B 7/0851* (2013.01)

(58) Field of Classification Search
CPC ............ H01Q 3/01–20; H01Q 3/2605; H01Q 3/2652; H01Q 3/267; H01Q 19/17;
(Continued)

(56) References Cited

U.S. PATENT DOCUMENTS 4,965,588 A 10/1990 Lenormand et al.
5,926,130 A 7/1999 Werntz
(Continued)

FOREIGN PATENT DOCUMENTS

CN 102217213 A 10/2011
CN 107636985 A 1/2018
(Continued)

OTHER PUBLICATIONS

International Search Report & Written Opinion for PCT/US2020/017847 dated May 28, 2020, 19 pages.

*Primary Examiner* — Cassi J Galt
(74) *Attorney, Agent, or Firm* — Holland & Hart LLP

(57) ABSTRACT

An antenna system of a satellite may consist of an antenna receiver that is coupled to a plurality of flexible couplings. The couplings may each be affixed to one or more antenna elements. The couplings may be deployed in space in an uncontrolled manner. Additionally, the spacing between the couplings, and in turn the antenna elements, may be spaced in an uncontrolled manner. The antenna elements may have no pointing requirements. The antenna system may receive training signals and associate an antenna element to a time of arrival based on the training signal. Upon receiving a data signal, the antenna system may apply coefficients determined from the association of the antenna element to the time of arrival to the data signal to discover wanted signal coherence among the antenna elements.

24 Claims, 6 Drawing Sheets

Related U.S. Application Data

(60) Provisional application No. 62/808,554, filed on Feb. 21, 2019, provisional application No. 62/804,476, filed on Feb. 12, 2019.

(58) Field of Classification Search
CPC ............. H01Q 21/00–30; H01Q 1/085; H01Q 1/28–30; H01Q 1/288; H04B 7/08–0897; H04B 7/185–195; G01R 29/10
See application file for complete search history.

(56) References Cited

U.S. PATENT DOCUMENTS

| | | | |
|---|---|---|---|
| 7,742,750 B2 | 6/2010 | Wolcott et al. | |
| 9,083,426 B1 | 7/2015 | Freedman et al. | |
| 9,819,083 B1 | 11/2017 | Chen | |
| 10,205,491 B2 | 2/2019 | Molev Shteiman | |
| 11,489,586 B2 | 11/2022 | Knopp | |
| 2002/0067311 A1 | 6/2002 | Wildey et al. | |
| 2004/0061644 A1 | 4/2004 | Lier et al. | |
| 2007/0200763 A1* | 8/2007 | Allen | H01Q 21/24 343/879 |
| 2009/0167604 A1 | 7/2009 | Roberts et al. | |
| 2012/0050106 A1 | 3/2012 | Quan et al. | |
| 2016/0127027 A1 | 5/2016 | Ling et al. | |

FOREIGN PATENT DOCUMENTS

| | | |
|---|---|---|
| EP | 1160913 | 12/2001 |
| JP | H04241527 | 8/1992 |
| JP | 2001211027 | 8/2001 |
| JP | 4409981 | 2/2010 |
| WO | 2016063415 | 4/2016 |

* cited by examiner

ULTRA-LOW COST HIGH PERFORMANCE SATELLITE APERTURE

CROSS-REFERENCES

The present Application for Patent is a Continuation of U.S. patent application Ser. No. 17/429,275 by PARKER et al., entitled 'ULTRA-LOW COST HIGH PERFORMANCE SATELLITE APERTURE" filed Aug. 6, 2021, which is a 371 national phase filing of International Patent Application No. PCT/US2020/017847 by PARKER et al., entitled "ULTRA-LOW COST HIGH PERFORMANCE SATELLITE APERTURE" filed Feb. 12, 2020, which claims the benefit of U.S. Provisional Patent Application No. 62/804,476 by PARKER et al., entitled "ULTRA-LOW COST HIGH PERFORMANCE SATELLITE APERTURE," filed Feb. 12, 2019, and claims the benefit of U.S. Provisional Patent Application No. 62/808,554, by PARKER et al., entitled "ULTRA-LOW COST HIGH PERFORMANCE SATELLITE APERTURE," filed Feb. 21, 2019, each of which is assigned to the assignee hereof, and each of which are expressly incorporated by reference herein in its entirety.

BACKGROUND

The following relates generally to antenna systems, and more specifically to an ultra-low cost high performance satellite aperture.

In satellite systems, many different antenna types are used with specialized properties for particular applications. For example, a satellite may utilize a dish antenna to receive and transmit signals. The dish antenna may consist of a parabolic reflective surface and a central feed horn. The parabolic surface facilitates the convergence of incident beams where the incident beams are reflected to the central feed horn, which is positioned at the focal point of the curvature. When the dish antenna receives signals, the incoming signal becomes much more consolidated due to the combined energy of individual radio signals. Another example of an antenna is an active electronically scanned array (AESA). An AESA is a type of phased array antenna in which the beam of signals can be steered electronically in any direction, without physically moving the antenna. The antenna consists of an array of regularly spaced small antennas each with a separate feed. The beam is steered electronically by controlling the phase of the radio waves transmitted and received by each of the multiple radiating elements in the antenna. This digitally controlled scanning nature of the AESA allows it to quickly scan any direction in comparison to a mechanically scanned radar, whose range is constrained by the direction it is facing and how quickly its motors can turn it.

However, each antenna type has certain drawbacks that make them ill-suited for every application. For example, each antenna type varies in size, mechanical complexity, power, cooling, weight, price, etc., which may dictate which antenna is to be used for a particular function. In some cases, an antenna that is uncomplicated mechanically and low cost may be desired.

SUMMARY

The described techniques relate to improved methods, systems, devices, and apparatuses for an ultra-low cost high performance satellite aperture. An antenna system of a satellite may consist of an antenna receiver that is coupled to a plurality of flexible couplings. The couplings may each be affixed to one or more antenna elements. The couplings may be deployed in space in an uncontrolled manner. Additionally, the spacing between the couplings, and in turn the antenna elements, may be spaced in an uncontrolled manner. The antenna elements may have no pointing requirements. The antenna system may receive training signals and associate an antenna element to a time of arrival based on the training signal. Upon receiving a data signal, the antenna system may apply coefficients determined from the association of the antenna element to the time of arrival to the data signal to discover wanted signal coherence among the antenna elements.

DETAILED DESCRIPTION

The described features generally relate to an antenna system where the antenna elements of the system each have an imprecise placement in space. Each of the antenna elements may be flexibly coupled to an antenna receiver, and the couplings may be deployed in space in an uncontrolled manner. Upon receiving data signals from a transmitter, the antenna system may apply linear algebra and multiple-input multiple-output (MIMO) signal processing to discover signal energy coherence to coherently add all the collected signal energy.

In contrast to other antenna systems, such as dish antenna systems, the present antenna system has low mechanical complexity and may be produced at low relative cost. For example, a dish antenna may have high manufacturing tolerances to maintain signal energy coherence. Also the high gain of the present system would be equivalent to the gain of a dish antenna with a very large diameter. Using a dish antenna with a very large diameter would not only increase manufacturing cost, but also its use would increase other costs such as transportation and integration costs since the dish antenna would need to be transported and assembled in space. In addition, the directionality of the present antenna system is configurable as opposed to conventional antenna systems, reducing mechanical complexity involved in antenna pointing.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, and devices may individually or collectively be components of a larger system, wherein other procedures may take precedence over or otherwise modify their application.

Figure 1:
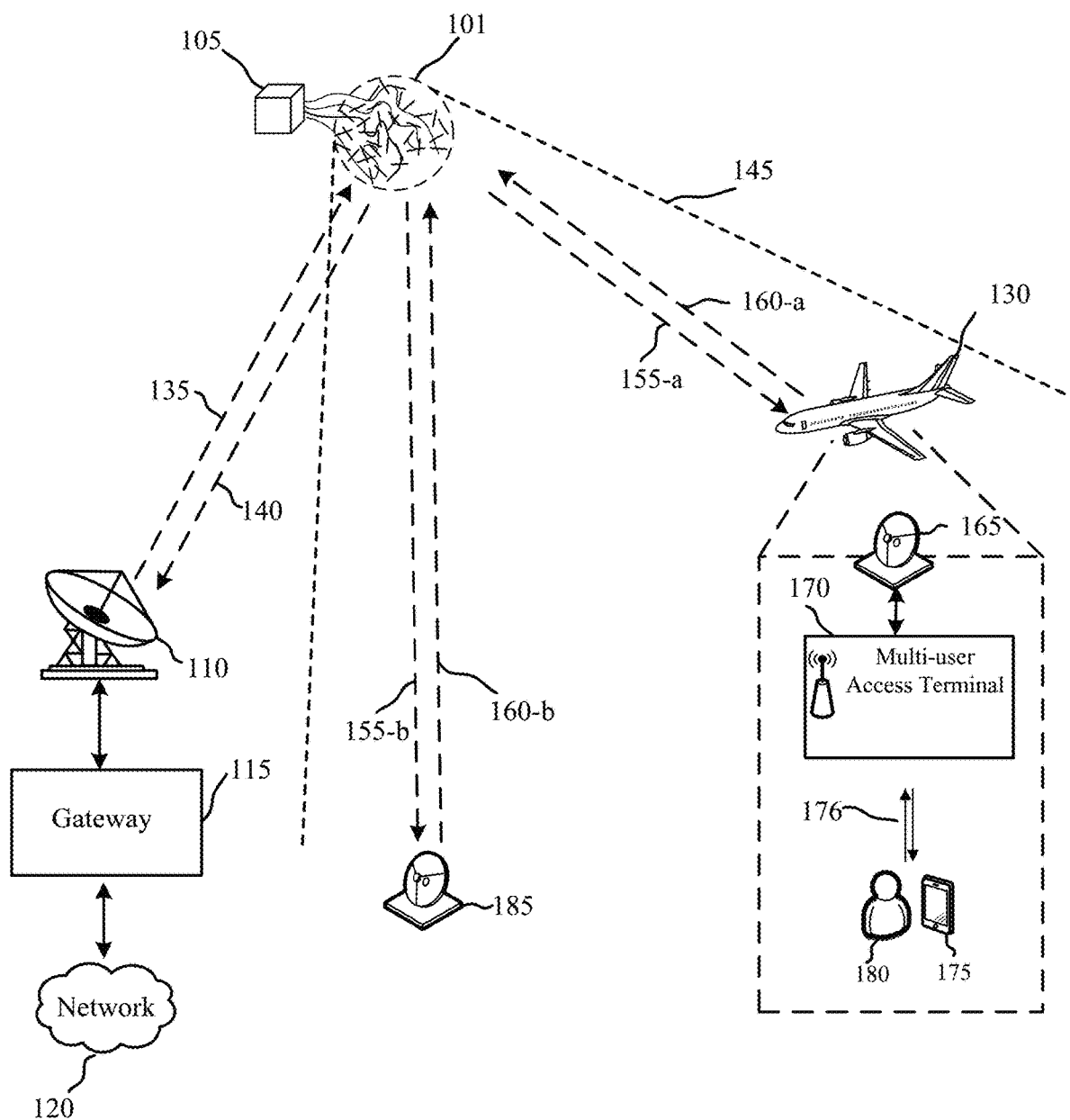
FIG. 1 illustrates an example of a system for wireless communications that supports an ultra-low cost high performance satellite aperture in accordance with aspects of the present disclosure.

FIG. 1 is a simplified diagram of a satellite communications system 100 in which the principles included herein may be described. The satellite communications system 100 may provide a communication service across at least portions of a visible earth area from the position of the satellite 105. Satellite 105 may be any suitable type of satellite, for example a geostationary orbit (GEO) satellite, medium earth orbit (MEO) satellite, or low earth orbit (LEO) satellite. Satellite may provide the communication service via user beams 145, which may each provide coverage for a user beam coverage area. Although only a single user beam 145 is illustrated, satellite 105 may be a multi-beam satellite, transmitting a number (e.g., typically 20-500, etc.) of user beams 145 each directed at a different region of the earth. This can allow coverage of a relatively large geographical area and frequency re-use within the covered area. Frequency re-use in multi-beam satellite systems permits an increase in capacity of the system for a given system bandwidth.

Each satellite beam 145 of the satellite 105 may support a number of user terminals 185. User terminals 185 may receive data from satellite 105 via forward downlink signals 155-a and transmit data via return uplink signals 160-a. A user terminal 185 may be any two-way satellite fixed or mobile ground station such as a very small aperture terminal (VSAT). Each satellite beam 145 may support other terminals such as multi-user access terminals 170, which may also be fixed or located on a mobile platform 130 such as an aircraft, ship, vehicle, train, or the like. As illustrated in FIG. 1, a satellite beam 145, which may be assigned to a particular frequency range and polarization, may carry forward downlink signals 155 or return uplink signals 160 for both fixed terminals 185 and multi-user access terminals 170. The forward downlink signals 155 or return uplink signals 160 for user terminals 185 and multi-user access terminals 170 may be multiplexed within the satellite beam 145 using multiplexing techniques such as time-division multiple access (TDMA), frequency-division multiple access (FDMA), multi-frequency time-division multiple access (MF-TDMA), code-division multiple access (CDMA), orthogonal frequency division multiple access (OFDMA), and the like.

Satellite communications system 100 includes a gateway system 115 and a network 120, which may be connected together via one or more wired or wireless links. Gateway system 115 is configured to communicate with one or more user terminals 185 or multi-user access terminals 170 via satellite 105. Network 120 may include any suitable public or private networks and may be connected to other communications networks (not shown) such as the Internet, telephony networks (e.g., Public Switched Telephone Network (PSTN), etc.), and the like. Network 120 may connect gateway system 115 with other gateway systems, which may also be in communication with satellite 105 or other satellites. Alternatively, a separate network linking gateways and other nodes may be employed to cooperatively service user traffic. Gateway system 115 may also be configured to receive return signals from user terminals 185 or multi-user access terminals 170 (via the satellite 105) that are directed to a destination in network 120 or the other communication networks.

Gateway system 115 may be a device or system that provides an interface between network 120 and satellite 105. Gateway system 115 may use an antenna 110 to transmit signals to and receive signals from satellite 105 via a forward uplink signals 135 and return downlink signals 140. Antenna 110 may be two-way capable and designed with adequate transmit power and receive sensitivity to communicate reliably with satellite 105. In one embodiment, satellite 105 is configured to receive signals from antenna 110 within a specified frequency band and specific polarization. Although illustrated as including one satellite 105, satellite communications system 100 may include multiple satellites. The multiple satellites may have service coverage areas that at least partially overlap with each other.

Each satellite user beam 145 of satellite 105 supports user terminals 185 or multi-user access terminals 170 within its coverage area (e.g., providing uplink and downlink resources). Frequency re-use between satellite user beams 145 may be provided by assigning one, or more, ranges of frequencies (which may be referred to as channels) to each satellite user beam 145 and/or by use of orthogonal polarizations. A particular frequency range and/or polarization may be called a "color," and frequency re-use in a tiled spot beam satellite system may be according to color.

The coverage of different satellite user beams 145 may be non-overlapping or have varying measures of overlap, up to and including a 100% overlap. In one example, satellite user beams 145 of satellite 105 may be tiled and partially overlapping to provide complete or almost complete coverage for a relatively large geographical area where partially overlapping or adjacent beams use different ranges of frequencies and/or polarizations (e.g., different colors).

Satellite 105 may provide network access service to communication devices (e.g., computers, laptops, tablets, handsets, smart appliances) connected to user terminal 185 or to communication devices 175 of passengers 180 on board mobile platform 130. For example, passengers 180 may connect their communication devices 175 via wired (e.g., Ethernet) or wireless (e.g., WLAN) connections 176. Multi-user access terminal 170 may obtain the network access service via user beam 145.

Multi-user access terminal 170 may use an antenna 165 mounted on mobile platform 130 to communicate via forward downlink signals 155-a and return uplink signals 160-a. Where multi-user access terminal 170 is located on a mobile vehicle, antenna 165 may be mounted to an elevation and azimuth gimbal which points antenna 165 (e.g., actively tracking) at satellite 105. Satellite communications system 100 may operate in the International Telecommunications Union (ITU) Ku, K, or Ka-bands (for example from 17.7 to 21.2 Giga-Hertz (GHz) in the downlink and 27.5 to 31 GHz in the uplink portion of the Ka-band). Alternatively, satellite communications system 100 may operate in other frequency bands such as C-band, X-band, S-band, L-band, UHF, VHF, and the like.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In one example, satellite 105 includes or is coupled with an antenna system 101 which includes an antenna transceiver system that is coupled to a plurality of flexible couplings. The couplings may each connect the receiver to one or more antenna elements. The antenna transceiver system may have one or more transceivers. The antenna system may be 101 may be packaged for deployment of satellite 105 in a compact arrangement of the flexible couplings and the antenna elements. Once the satellite 105 reaches a target orbit (e.g., LEO, MEO, GEO), the couplings may be deployed in space to spread the antenna elements over an area for the aperture of the antenna system. The deployed locations of each antenna element may not be predetermined or controlled during deployment. Thus, the spacing between the couplings, and in turn the antenna elements, may not be predefined prior to deployment, and may be spaced in an uncontrolled manner by the physical properties of the flexible couplings. Satellite 105 may possess one or more features as described herein with respect to the disclosed antenna system 101.

After deployment, antenna system 101 of satellite 105 may receive training signals from various transmitting devices, such as antenna 110, user terminal 185, or antenna 165. One or more antenna elements of antenna system 101 may receive these training signals and a processor of antenna system 101 may determine position-related information such as time-of-arrival (TOA) parameters and associate the TOA parameters to respective antenna elements. Antenna system 101 may further determine reception coefficients based on the TOA parameters. Each coefficient may be based on a unique (e.g., per transceiver) time of arrival signature (e.g., eigenmode). Antenna system 101 may receive subsequent signals from antenna 110, user terminal 185, or antenna 165 such as data signals, and a processor of antenna system 101 may process the data signals utilizing the coefficients. The transmitter transmitting the data signals may be a same or different transmitter from the one that transmitted the training signals.

Antenna system 101 may also allow frequency re-use between satellite user beams 145 to be obtained by the unique weighting of time-of-arrival between satellite user beams 145 end points where user beam end points are the satellite 101 and terminals (e.g., antennas of user terminal 185 or multi-user access terminal 170). Because the weighting of time-of-arrivals is unique, the signal communications carried by satellite user beams 145 may be uniquely separated from other satellite user beams (e.g., through linear algebra). For example, each user beam 145 may be associated with a different set of coefficients. Hence the entire frequency assigned to each satellite user beam 145 may be reused by other satellite user beams with no or negligible impairment of system communication performance. The uniqueness of weighting of time-of-arrival between satellite user beams 145 and end points may be determined by the diameter of a volumetric 3D shape of antenna system 101, the number of antenna elements of antenna system 101, the separation between user terminals, or a combination thereof.

Multiple satellite user beams 145 and signals associated with the beams having the same frequency range can be received at the same time and distinguished via weighting coefficients. The size of the volumetric shape and number of elements determine the spatial or geographic resolution for distinguishing signals from different transmitters using different angles of arrival. The design may be able to achieve a resolution in the 100 m to 1 km range (e.g., with a volumetric 3D shape of approximately 1 km and 1,000 elements in a LEO configuration), and thus may support very small effective user beams.

Figure 2:
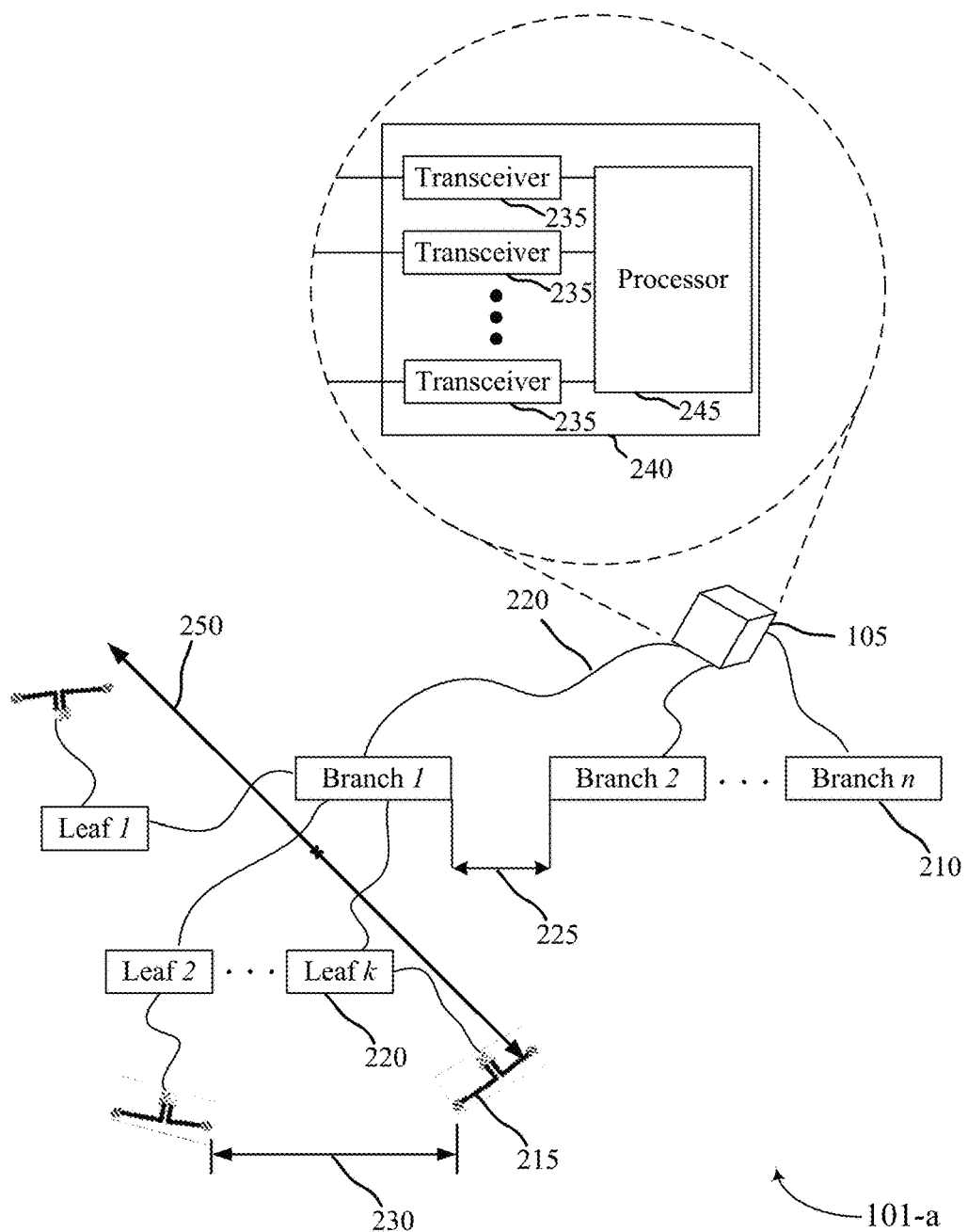
FIG. 2 illustrates an example of a satellite for wireless communications that supports an ultra-low cost high performance satellite aperture in accordance with aspects of the present disclosure.

FIG. 2 illustrates an example of an antenna system 101-a for wireless communications that supports an ultra-low cost high performance satellite aperture in accordance with aspects of the present disclosure. Antenna system 101-a may include antenna transceiver system 240, branches 210, antenna elements 215, and couplings 220, and may be part of or coupled with a satellite 105. Antenna system 101-a may be an example or implement aspects of antenna system 101 of FIG. 1. Antenna system 101-a may be an example of an n-layer MIMO antenna. In some examples, antenna system 101-a may be a 2-layer MIMO antenna.

Antenna transceiver system 240 may receive signals, such as training signals and data signals. Antenna transceiver system 240 may include multiple transceivers 235 and a processor 245. Each transceiver 235 may be connected to one or more antenna elements 215 (or leaf antennas), via a flexible coupling 220. Flexible coupling 220 may be constructed out of a flexible or semi-rigid material (e.g., wire, coated wire, coaxial cable, twisted pairs of wires, shielded wires, electrically conductive mechanical swivels, springs, rotators, gimbles, etc.) that electrically couples to the one or more antenna elements while not constraining the deployed location of the one or more antenna elements 215 in each dimension. That is, the deployed positions of the one or more antenna elements 215 may be constrained by their position along the flexible coupling, but may otherwise be unconstrained in one or more spatial dimensions. In some cases, the manner of an uncontrolled deployment of antenna elements 215 is within a range of pliability of flexible coupling 220. In some examples, antenna elements 215 may be attached to flexible coupling 220 via a coupler while in other examples, antenna elements 215 may be directly attached to flexible coupling 220. Although the precise positioning of antenna elements 215 may be uncontrolled, spatial separation of the antenna elements may allow for mutual coupling to be insignificant. In some examples, antenna system 101-a may include a quantity of antenna elements 215 greater than 100, or greater than 1000.

The energy received by antenna system 101-a may be proportional to the sum of the cross-sectional area of the effective aperture of antenna elements 215. The array gain of antenna system 101-a may be the sum of signal energy collected from the effective aperture of each antenna element 215. The gain of antenna system 101-a may be expressed as:

$$(\text{gain per antenna element}) + 10 \log(\text{number of antenna elements})$$

Antenna elements 215 may be randomly oriented (e.g., spatial locations not predetermined or precisely controlled) and may feature a large satellite aperture baseline. For example, antenna elements 215 may feature a baseline of greater than 100 meters, greater than 200 meters, greater than 500 meters, greater than a kilometer. Antenna system 101-*a* may use various types of antenna elements 215 (e.g., dipole, biconic, monopole, patch), and each antenna element 215 may be the same type, or antenna system 101-*a* may use a combination of different types, in some cases.

In their totality when deployed, antenna elements 215 may form a volumetric shape. In some examples, at least one dimension of the volumetric shape may be more than 100 times a distance of a wavelength of a data signal. In another example, an orientation of the volumetric shape is uncontrolled relative to an orbital position of the satellite, and in some cases an orientation of satellite 105 or antenna system 101-*a* may be uncontrolled during orbit (e.g., satellite 105 or antenna system 101-*a* may not use active attitude control). In some examples, the volumetric shape may be roughly spherical such that signals transmitted from any arbitrary angle and traversing the volumetric shape include a traversal of a diameter 250 (e.g., at least a minimum diameter) of the volumetric shape.

Antenna system 101-*a* may have the same number of transceivers 235 as antenna elements 215. For example, each of antenna elements 215 may be linked to its own transceiver 235 (e.g., each transceiver 235 may be coupled with a single antenna element 215). Alternatively, antenna system 101-*a* may have fewer transceivers 235 than antenna elements 215 (e.g., each transceiver 235 may be coupled with more than one antenna element 215).

In some examples, each of antenna elements 215 may be connected to a transceiver 235 via a series of branches 210 and leaves 220, with each branch 210 connected to one or more leaves 220, and with each leaf 220 connected to one or more antenna elements 215. In some examples, the quantity of branches 210 may be the same as the quantity of transceivers 235. For example, at least a subset of the branches 210 may include more than one antenna element 215, and each transceiver 235 may be coupled with one branch 210. The number of antenna elements 215 may be identical across all branches 210 or they can be different to optimize the antenna array or for power management, interference tolerance, or failed antenna elements. Each branch 210 may include thermal management (e.g., a heating element), and power or amplification components. Each leaf 220 may couple one or more antenna elements 215 to the branch 210 via a direct connection or a coupling (e.g., RF coupler). Each branch 210 may include components for pre-processing RF signals from the leaves 220 coupled with the branch 210. For example, each branch 210 may include analog or digital processing components such as filters, low-noise amplifiers, high-power amplifiers, phase shifters, mixers, analog-to-digital converters, or other signal processing components. In some examples, each branch 210 includes analog weighting circuitry (e.g., phase shifters, amplitude modulators) for applying analog beamforming weights to signals transmitted or received via the leaves 220 of the branch.

Each transceiver 235 may include components for RF communications (e.g., filters, a low-noise amplifier, high-power amplifiers, mixers, analog-to-digital converters, demodulators, or other signal processing components). For example, each transceiver 235 may include circuitry for MIMO processing such as for maximum ratio combining (MRC) of the signals from each branch 210, leaf 220, or antenna element 215 to which it is coupled.

Each branch 210 may be considered a sub-aperture of the total synthesized aperture of antenna system 101-*a*. Although not controlled to be predetermined distances, each branch 210 may be separated from another by a branch distance 225 and each leaf 220 or antenna element 215 may be separated from another by leaf distance 230. Thus, branch distance 225 and leaf distance 230 may be illustrated as average or minimum separable distances, while actual branch distances and leaf distances 230 between different branches 210 and leaves 220 may vary. Branch distance 225 or leaf distance 230 may provide sufficient separation between branches or leaves such that a time of arrival between the branches or leaves may be easily measured. For example, light travels one meter in 3.3 nanoseconds. Assuming that there is a 100 ns discrimination between time of arrival to match conventional digital logic processing, branch distance 225 or leaf distance 230 may be approximately 30 meters. Assuming that there is a 10 ns discrimination between time of arrival to match conventional digital logic processing, branch distance 225 or leaf distance 230 may be approximately 3 meters. Leaf distance 230 may be separated by a sufficient distance to simplify the radiation pattern into separate and independent collections of the base antenna element radiation pattern. For example, each branch may include leaves 220 or antenna elements 215 spaced along its length by the leaf distance 230 to provide discrimination in time of arrival for each leaf 220 (assuming relatively low fold over or loop back of the branch 210. In some cases, some antenna elements 215 may end up having a leaf distance 230 of less than the minimum distance for discrimination. Where antenna elements 215 having less than a minimum leaf distance for discrimination are coupled with different transceivers 235 (e.g., via different branches 210), the signals may be discriminated via the different transceivers. Where the antenna elements 215 are coupled with the same transceiver 235, coefficients may be combined or the signal may be suppressed to reduce the effects of the composite signal for the antenna elements 215 without being discriminated.

In some cases, leaf distances 230 or branch distances 225 may be maintained using mechanical devices. For example, semi-rigid members (not shown) may be connected at a location along branches 210 and may provide a separating force that may tend to keep branches 210 apart from each other. The members may be foldable or collapsible for packaging for launch and orbit insertion of a satellite 105. In other examples, the leaves 220 or branches 210 may be connected to an inflatable structure (e.g., balloon) that is inflated upon deployment. In other examples, a weighted object coupled with an end of a branch 210 may be ejected (e.g., via a spring) from satellite 105, and may extend a flexible coupling (e.g., wire) of the branch to a desired extension from satellite 105. In yet other examples, the mechanical force for maintaining branch distances 225 or leaf distances 230 may come from centrifugal force in deployment or operation. For example, a satellite 105 may be inserted into an orbit with a rotation or may use an attitude adjustment mechanism to establish a rotation, and the centrifugal force from the rotation may assist in maintaining the leaf distances 230 or branch distances 225.

In addition to forces from pneumatic (inflation), spring, and centrifugal forces, additional examples for deploying leaves 220 or branches 210 and creating separation for leaf distances 230 or branch distances 225 include: mechanical ratchets or pawls; chemical reactions which may change structure and harden after deployment to maintain or guide leaf distances 230 and branch distances 225; electrostatic forces which attract or repel leaves 220 and branches 210; or thermal expansion of the mechanical structures which connect the leaves 220 and branches 210. In some instances, miniature reaction jets, pyrotechnic devices, or ion thrusters may be used to deploy, maintain, or guide leaf distances 230 and branch distances 225 (e.g., to maintain a minimum distance, without strictly controlling position). Any combination or individual selection of these methods may be used.

In one example of a combination of these methods, a large array of patch antennas may be assembled as leaves 220 covering all 4 Pi steradians on an inflatable ball which also serves as a ground plane. These patch antenna leaves 220 may connect via flexible connectors to branches 210 which individually connect back to the satellite 105 (e.g., to transceivers 235). At deployment, spring forces may be used to eject the branches 210 outward which may contain uninflated patch antennas. On reaching deployment, a chemical reaction may be used to harden the branches 210 and the leaves 220 including inflatable balls of patch antennas (which may be pyrotechnically inflated using pneumatic force to complete the deployment).

In a second example of how these methods may be combined, a large array of biconic antennas may be assembled as biconic antenna leaves 220 and may contain a mechanical spring which assumes a proper shape on release from a confining constraint. These biconic antenna leaves 220 may connect via flexible connectors to branches 210 which individually may connect back to the satellite 105. At deployment, pneumatic forces may be used to inflate the branches 210 which may extend the branches outward and simultaneously release the biconic antenna leaves 220 from their confining constraint allowing the spring force to force each leaf 220 into a predefined shape. On reaching deployment, a chemical reaction may be used to harden the inflated branches to complete the deployment.

In a third example of how these methods may be combined, a large array of dipole antennas may be assembled as leaves 220 and may contain a mechanical spring which assumes a predefined shape on release from a confining constraint. These dipole antenna leaves 220 may connect via flexible connectors to branches 210 which individually may connect back to the satellite 105. At deployment, spring forces may be used to launch the branches 210 outward which may release the dipole antenna leaves 220 from their confining constraint allowing the spring force to force each leaf 220 into the predefined shape. Electrostatic forces may be applied to each branch 210 and to each leaf 220 of like charge, forcing each leaf 220 and branch 210 to repel each other to complete the deployment.

In a fourth example of how these methods may be combined, a large array of mixed antenna types of leaves consisting of monopole and patch antennas may be assembled as leaves 220. The leaves 220 may cover all 4 Pi steradians on a ball which may use spring tension to maintain its shape and may also serve as a ground plane. These monopole and patch antenna leaves 220 may connect via flexible connectors to branches 210 which individually may connect back to the satellite 105. At deployment, spring forces may be used to launch the branches 210 outward which may release the monopole and patch antenna ball leaves 220 from their confining constraint allowing the spring force to force each leaf 220 into the proper shape. In conjunction with the initial spring forces for launching the branches 210 outward, thermal energy received from the sun may strike each branch 210 and the material of each branch may expand, forcing a mechanical network of ratchets and pawls to lock into place and forcing each leaf 220 and branch 210 to complete the deployment.

Interference tolerance within the linear dynamic range of antenna system 101-a is managed via the MIMO selection of the data signal. Interference tolerance (dynamic range compression) is managed via the ratio of the number of antenna elements 215 needed to close the link between a user terminal on the ground, satellite 105, and the total number of antenna elements 215.

Figure 3A:
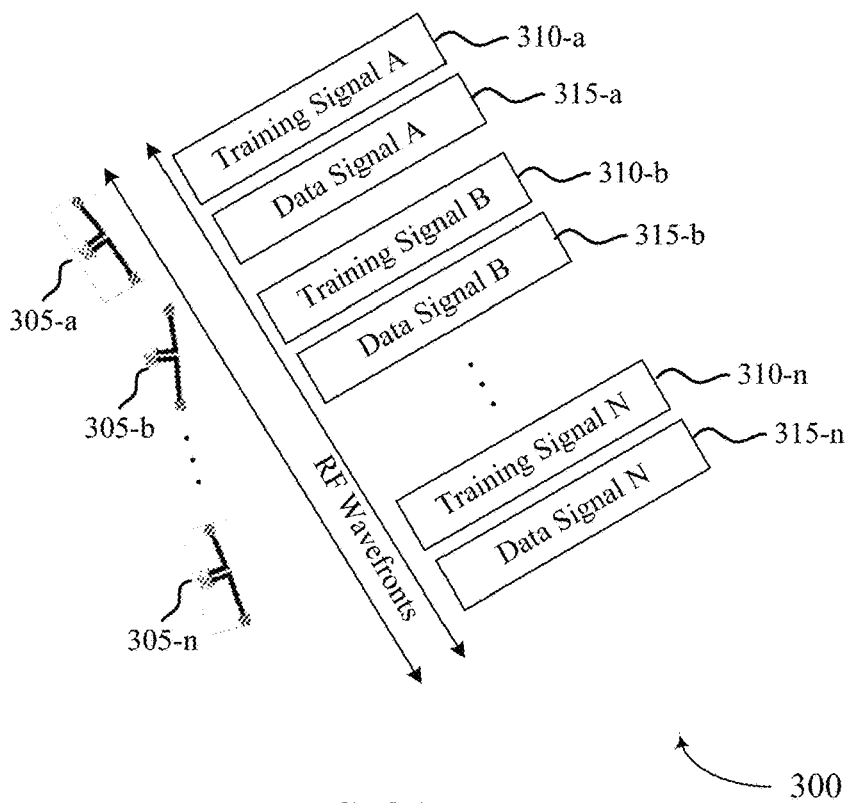
FIG. 3A and FIG. 3B illustrates an example of a satellite for wireless communications that supports an ultra-low cost high performance satellite aperture in accordance with aspects of the present disclosure.

FIG. 3A illustrates an example of a signal receiving technique 300 for wireless communications that supports an ultra-low cost high performance satellite aperture in accordance with aspects of the present disclosure. In some examples, antenna elements 305 may implement aspects of antenna elements 215 as described in FIG. 2.

Transmitting devices such as antenna 110 and/or user terminal 185 may send training signals 310 to antenna elements 305 prior to sending data signals 315. Training signals (e.g., 310-a, 310-b, . . . 310-n) may arrive at antenna elements 305 sequentially or in any overlapping order. In some examples, training signals 310 may be received concurrently (e.g., at least partially overlapping in time) at antenna elements 305 (e.g., and over the same frequency) if training signals 310 are coming from locations separated by a minimum spatial or geographic resolution (e.g., 100 m-1 km range). Training signals 310 generally comprise sequences that are known in advance to satellite 105. Training signals 310 may be encrypted in order to authenticate and ensure that training signals 310 from valid user terminals are processed. In some examples, training signals 310 are orthogonal sequences.

Training signals 310 may also convey additional information (e.g., through the use of multiple available sequences). In some examples, training signals 310 may include location information for a user terminal. For example, a user terminal could know its location (e.g., via GPS or other geolocation signals), and in some cases, may indicate a code associated with the location in the training signals 310. In one example, each user beam is associated with a different code, and a user terminal may determine which beam is serving the user terminal (e.g., using the location information and stored beam coverage area information, or using received signals indicating the user beam). The user terminal may then select a code associated with the beam, or one of a group of codes associated with the beam (e.g., randomly). In some cases, the information may include a priority for the communications. For example, a certain user may have priority or may select between multiple priorities based on a type of data for communication. In other examples, training signals 310 may include information such as user terminal type, user type, etc. In some examples, the same transmitting device may send training signals 310 and data signals 315. In other examples, the transmitting device sending training signals 310 may be different from the transmitting device sending data signals 315. Due to antenna elements 305 shifting in space or changing attitude (e.g., without attitude control during orbit), antenna system 101 may continually or periodically receive training signals 310 for proper channel tracking as the channel and the distance from a particular antenna element 305 to the transmitting device regularly changes.

A transceiver (e.g., transceiver 235) may receive a training signal 310-a from one or more antenna elements 305 (e.g., antenna element 305-a, antenna element 305-b, and antenna element 305-n). A training processor of antenna system 101 (e.g., processor 245) may receive the signals from each respective antenna element 305 (e.g., from one or more transceivers) and determine a time of arrival for each of antenna elements 305 based on the received training signal 310-a. A beam weight processor of antenna system 101 (e.g., processor 245) may determine coefficients for each respective determined time of arrival. At a subsequent time, the one or more transceivers may receive data transmission 315-a received at antenna elements 305. The beam weight processor may then combine the received data signals from each antenna element 305 with a respective determined coefficient associated with each antenna element 305 to decode data signal 315-a. For example, the beam weight processor may use maximum ratio combining (MRC) to combine the signals according to the determined coefficients. In some cases, the beam weight processor may generate signals for transmission from one or more antenna elements 305 based on the determined coefficients.

In one example, the transceiver may receive training signals associated with each data signal. For example, the transceiver may receive training signal 310-b received at each antenna element 305 from the same or a different transmitter and determine a time of arrival for each of the plurality of antenna elements 305 based on the received training signal 310-b. The beam weight processor may then update the previously determined coefficients (associated with training signal 310-a) with newly determined coefficients from the time of arrival data associated with training signal 310-b for reception of data signal 315-b. Each additional data signal (e.g., data signal 315-n) may be preceded by a training signal (e.g., training signal 310-n).

In another example, the training processor may determine time of arrival information based on multiple training signals (e.g., training signals 310-a and 310-b) received from known locations and determine spatial information for each antenna element 305. Using the spatial information, the beam weight processor may determine time of arrivals (e.g., eigenmodes) for each antenna element for a data transmission 315 from a known location (which may be the same as one of the known locations for the training signals, or a different location). The beam weight processor may then combine the received data transmission from each antenna element 305 with a respective determined coefficient associated with each antenna element 305 to decode the data transmission 315.

As described above, antenna elements 305 may be associated with branches, where each branch may have multiple antenna elements 305 and may include circuitry for preprocessing signals. In some examples, determining the coefficients for each training signal 310 associated with a data signal 315 may be performed on a branch basis. For example, the antenna elements 305 on each branch may be characterized or calibrated based on training signals from one or more sources (e.g., from at least two physically separated transmitters), and the circuitry (e.g., analog weighting circuitry) of the branch may combine signals received by the elements 305 of the branch into a combined branch signal. The transceiver may then receive training signals associated with each data signal, and determine time of arrivals for each combined branch signal from each branch based on the training signals. The beam weight processor may then determine coefficients based on the determined time of arrivals associated with the training signal for reception of a data signal. In some cases, the time of arrivals associated with the branches may be used to refine the weights applied within each branch. For example, the relative locations for each leaf may be characterized and a direction for the training signal determined from the time of arrivals for refining the weighting used for the leaves of the branch (e.g., for the associated data signal). Coefficients may be applied to each branch for transmission of signals based on the determined time of arrivals, and the circuitry of each branch (e.g., analog weighting circuitry) may apply weightings to each leaf for the transmitted signals.

Figure 3B:
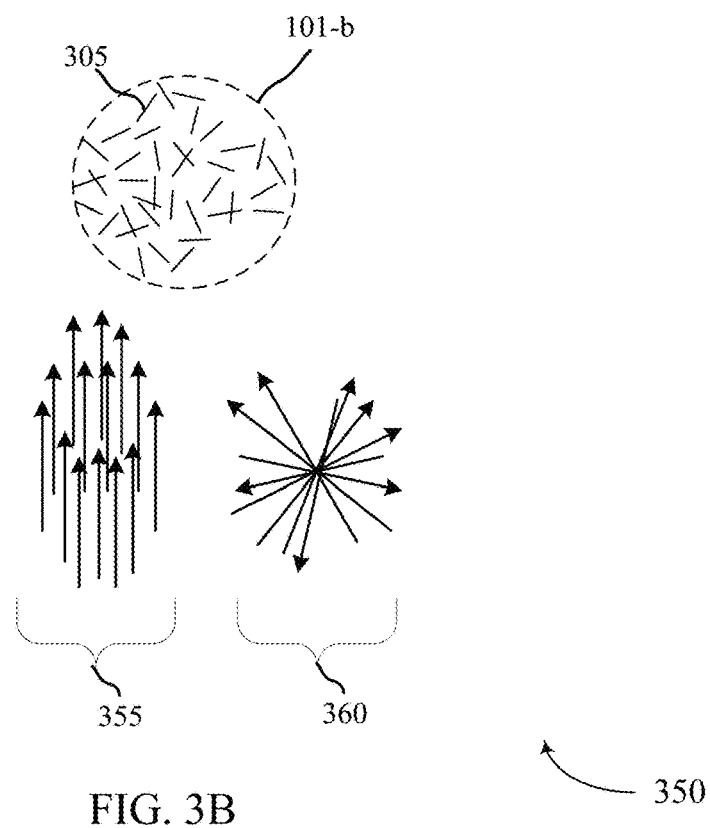

FIG. 3B illustrates an example of a signal receiving technique 350 for wireless communications that supports an ultra-low cost high performance satellite aperture in accordance with aspects of the present disclosure. In some examples, antenna system 101-b may implement aspects of antenna system 101 as described in FIG. 1 and of antenna system 101-a as described in FIG. 2.

Uncorrelated energy 360 may illustrate vectors associated with uncorrelated signals received via each antenna element 305 of antenna system 101-b. The beam weight processor may combine the uncorrelated signals of uncorrelated energy 360 according to the determined coefficients from one or more training signals 310 to result in correlated energy 355. A total amplitude and total power calculation of correlated energy 355 may be calculated as follows:

RMS_Total_Correlated_Amplitude =

$$\sum_{i=1}^{n \times k} \text{RMS\_Correlated\_Amplitude}_i = n \times k \times \text{RMS\_Correlated\_Amplitude}$$

RMS_Total_Correlated_SignalPower =

$$(n \times k \times \text{RMS\_Correlated\_Amplitude})^2$$

Where n is a total number of branches and k is a total number of leaves of antenna system 101-b. A total amplitude and total power calculation of uncorrelated energy 360 may be calculated as follows:

RMS_Total_Uncorrelated_Amplitude =

$$\sqrt{\sum_{i=1}^{n \times k} \text{RMS\_Uncorrelated\_Amplitude}_i^2} =$$

$$\sqrt{n \times k} \times \text{RMS\_Uncorrelated\_Amplitude}$$

RMS_Total_Uncorrelated_Power =

$$(n \times k \times \text{RMS\_Uncorrelated\_Amplitude})^2$$

Where n is a total number of branches and k is a total number of leaves of antenna system 101-b. A signal-to-noise ratio may be calculated as follows:

$$\text{Signal}_{Correlated} \div \text{Noise}_{Uncorrelated} = (n \times k) \times$$

$$(\text{RMS\_Correlated\_Amplitude})^2 \div (\text{RMS\_Uncorrelated\_Amplitude})^2$$

Here, uncorrelated noise power grows linearly while correlated signal power grows by a square.

Figure 4:
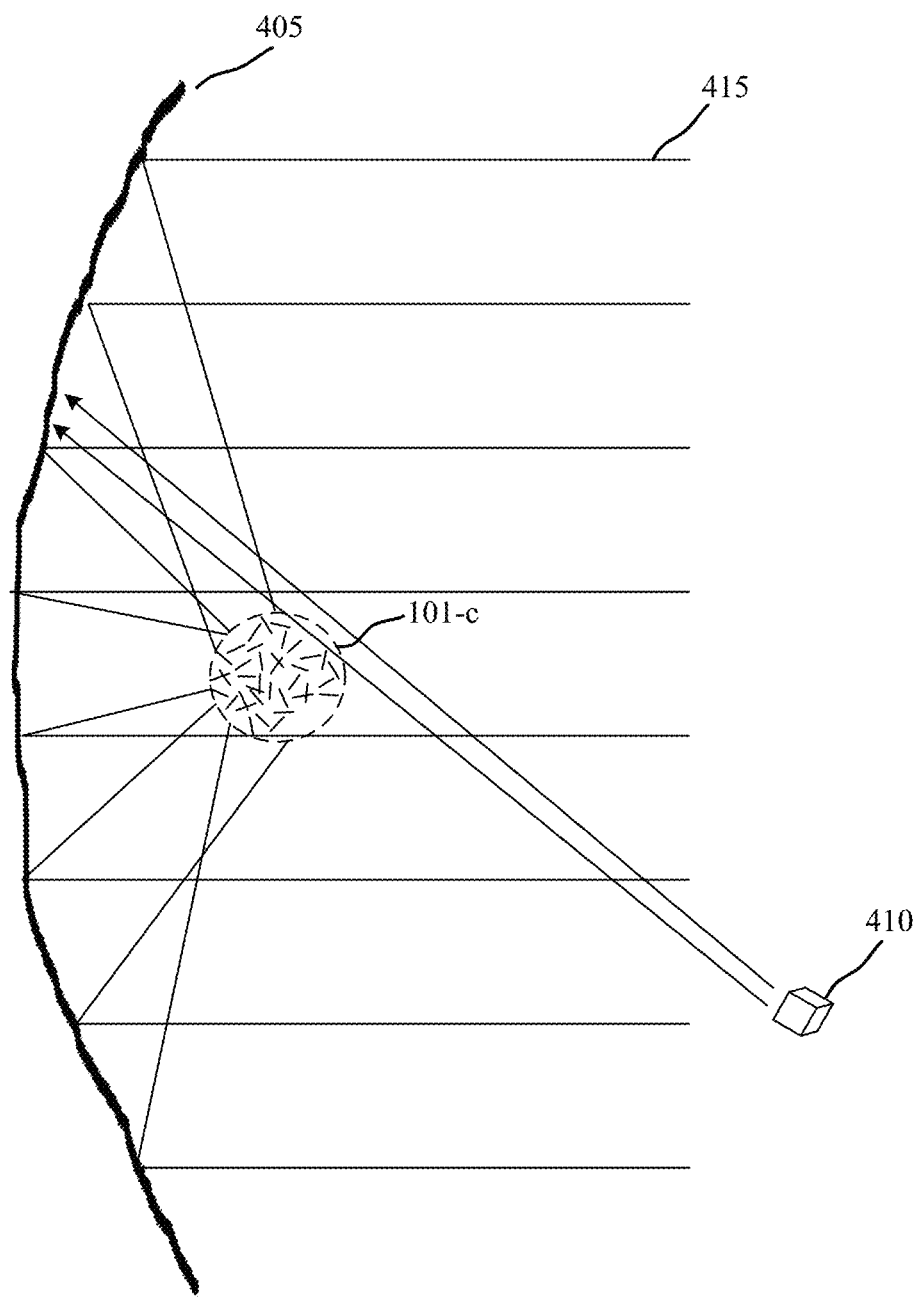
FIG. 4 illustrates an example of a satellite antenna for wireless communications that supports an ultra-low cost high performance satellite aperture in accordance with aspects of the present disclosure.

FIG. 4 illustrates an example of an antenna system 400 for wireless communications that supports an ultra-low cost high performance satellite aperture in accordance with aspects of the present disclosure. Antenna system 400 may include antenna system 101-c, dish 405, and emitter 410. In some examples, antenna system 101-c may implement aspects of antenna system 101 as described in FIG. 1, antenna system 101-a as described in FIG. 2, and antenna system 101-b as described in FIG. 3B. Antenna system 400 may be referred to as a hybrid dish/MIMO antenna system.

Dish 405 may represent a dish that is not perfectly parabolic. A benefit to a dish 405 that is not perfectly parabolic is that it may have looser manufacturing requirements compared to a conventional parabolic dish which may lead to lower manufacturing and implementation costs. In addition, dish 405 may be larger than a parabolic dish manufactured to tolerances typically used in satellite communication. For example, typical large parabolic dishes for satellite communication may be approximately five (5) to fifteen (15) meters in diameter. In some cases dish 405 may be significantly larger than typical large parabolic dishes for satellite communication, such as having a diameter of 30 meters, 50 meters, 100 meters, or larger. Dish may be collapsed for launch of a satellite 105, and may be extended to a deployed shape in a variety of ways. For example, dish 405 may be formed by a conductive coating on a balloon that is expanded when the antenna system 400 is deployed in orbit. Alternatively, deployment of dish 405 may be similar to deployment of a solar sail. Yet alternatively, dish 405 may be made up of multiple rigid elements, and may be unfolded in deployment.

Radio waves 415 may be received from a transmitter by dish 405 in an RF wave-front and reflected off of dish 405 to form a dispersed focal region. Antenna system 101-c and its associated antenna elements may be at least partially within the formed dispersed focal region of dish 405. In some examples, dish 405 may increase the RF flux power density into antenna system 101-c, and the antenna array of antenna system 101-c may be implemented such that a significant portion of the RF flux is captured by the antenna system 101-c. An efficiency of dish 405 may be calculated by taking the flux power redirected into the antenna system 101-c and dividing it by the flux power collected by the antenna system 101-c.

As described above, training signals from a transmitter may be used to generate coefficients for reception or transmission of signals from the antenna elements of antenna system 400. However, determination of the coefficients may include measurements of dish imperfections and antenna element locations. For example, a signal received at a given antenna element of antenna system 101-c may be reflected from multiple locations on dish non-coherently, and the dish imperfections may be measured and combined with time of arrival information for the antenna elements to determine the coefficients for receiving the signal coherently.

Additionally or alternatively, one or more auxiliary satellites 410 may be used to synthesize locations of antenna elements of antenna system 101-c. For example, one or more auxiliary satellites 410 may be positioned in a known location relative to antenna system 400, and may transmit signals that may be measured at antenna system 400 (e.g., determining antenna vectors for each element of antenna system 101-c). Using a known location of a transmitter, the dish imperfections may be measured to synthesize time of arrivals or antenna element coefficients in combination with training signals from the transmitter of a data signal, or without receiving training signals from the transmitter of the data signal.

Figure 5:
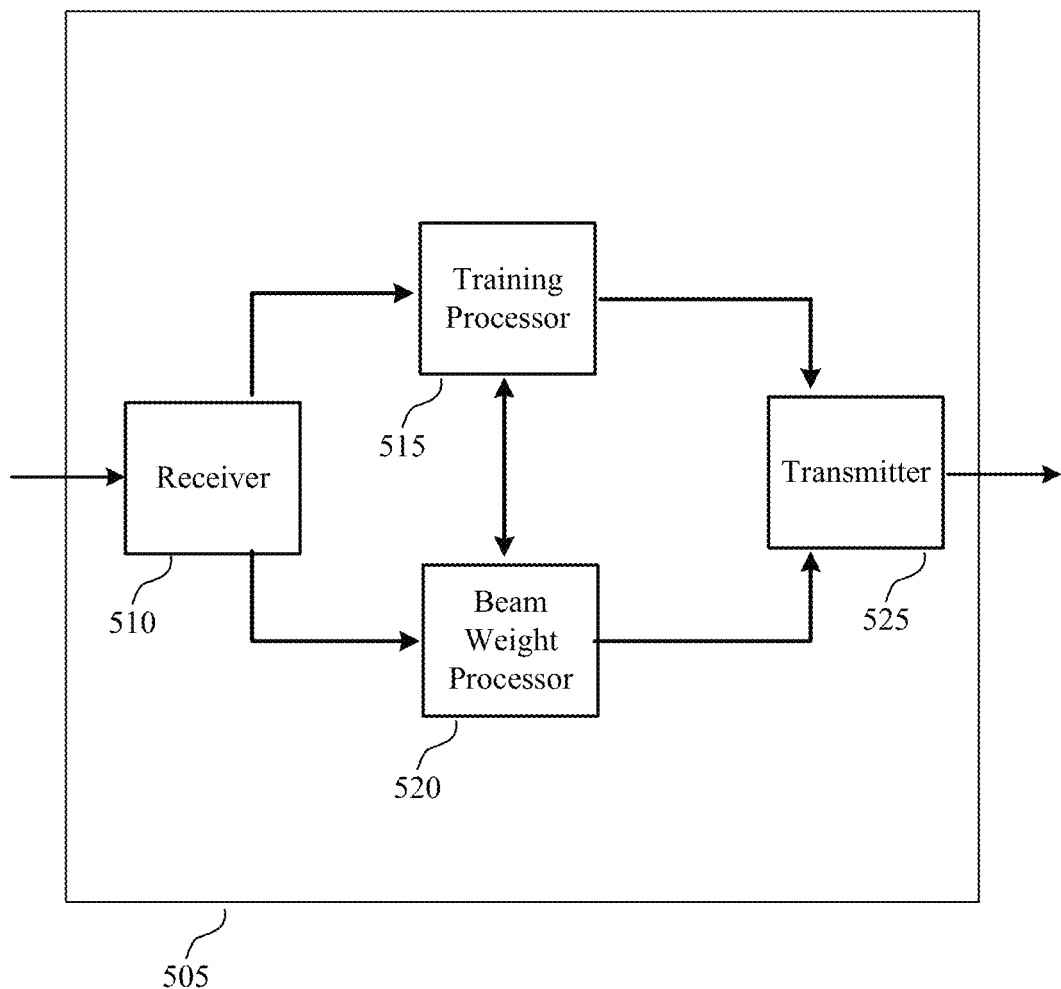
FIG. 5 shows a block diagram 500 of an apparatus 505 for an ultra-low cost high performance satellite aperture in accordance with aspects of the present disclosure.

FIG. 5 shows a block diagram 500 of an apparatus 505 for an ultra-low cost high performance satellite aperture in accordance with aspects of the present disclosure. In some examples, apparatus 505 may be an example of aspects of an antenna system 101 of FIGS. 1, 2, 3B, and 4. The apparatus 505 may include a receiver 510, a training processor 515, a beam weight processor 520, and a transmitter 525. The components may communicate via one or more buses.

The apparatus 505 and/or at least some of its various sub-components may be implemented in hardware, software executed by a processor, firmware, or any combination thereof. If implemented in software executed by a processor, the functions of the apparatus 505 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The apparatus 505 and/or at least some of its various sub-components may be physically located at various positions, including being distributed such that portions of functions are implemented at different physical locations by one or more physical devices. In some examples, the apparatus 505 and/or at least some of its various sub-components may be a separate and distinct component in accordance with various aspects of the present disclosure. In other examples, the apparatus 505 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The receiver 510 may receive information such as packets or user data. Information may be passed on to other components of the device 505. The receiver 510 may include multiple receiver chains, where each receiver chain may include circuitry for processing a received RF signal (e.g., amplifiers, mixers, analog-to-digital converters, demodulators). Each receive chain of receiver 510 may include circuitry to combine energy coherently from multiple antennas (e.g., MRC circuitry).

The training processor 515 may receive signals from the antenna receiver associated with one or more training signals from a transmitter. It may also associate each of a plurality of antenna elements with a respective time of arrival based at least in part on one or more training signals. It may also determine a respective time of arrivals based at least in part on a location of a transmitter and respective time of arrival vectors. The one or more training signals may include an indicator of location information associated with the transmitter, an indicator of a user beam for the transmitter, a priority for communications from the transmitter, or a combination thereof. The training processor 515 may be configured to decrypt the one or more first signals to obtain the one or more training signals and validate the one or more training signals based on the decrypting.

The beam weight processor 520 may combine one or more signals associated with a data signal from a transmitter received via a receiver according to a plurality of coefficients determined based at least in part on associations between a plurality of antenna elements and respective time of arrivals. It may also update the plurality of coefficients based at least in part on a second respective time of arrivals. It may also generate one or more signals for transmission from a plurality of antenna elements to a target receiver based at least in part on a plurality of coefficients determined based at least in part on the associations between a plurality of antenna elements and respective time of arrivals.

The training processor 515 and the beam weight processor 520 may be examples of a processor that may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor may be configured to operate a memory array using a memory controller. In other cases, a memory controller may be integrated into the processor. The processor may be configured to execute computer-readable instructions stored in memory to perform various functions.

The transmitter 525 may transmit signals generated by other components of the device 505. The transmitter 525 may include multiple transmitter chains, where each transmitter chain may include circuitry for processing a digital signal to generate an RF signal for transmission (e.g., modulators, digital-to-analog converters, mixers, amplifiers). In some examples, the transmitter 525 may be collocated with a receiver 510 in a transceiver (e.g., which may include multiple receive/transmit chains).

Figure 6:
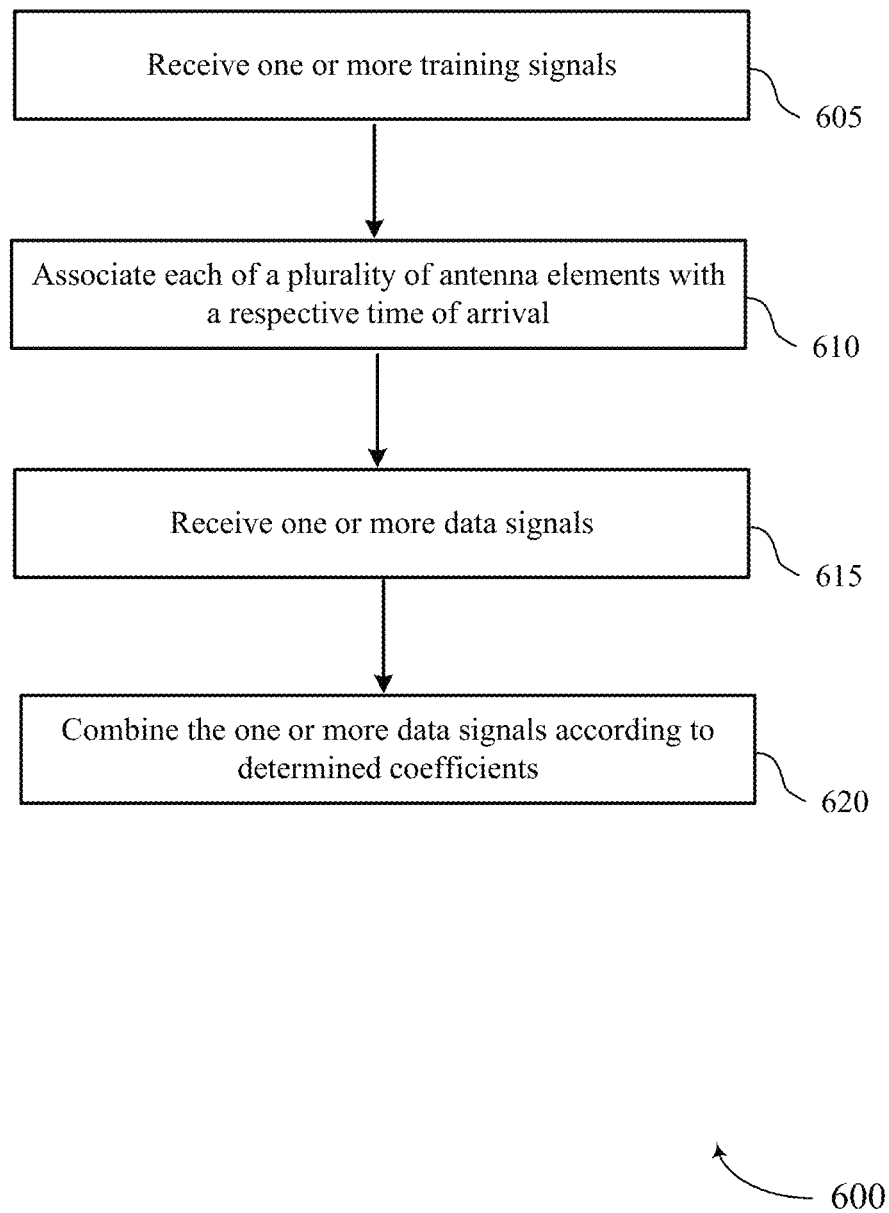
FIG. 6 shows a flowchart illustrating a method 600 that supports an ultra-low cost high performance satellite aperture in accordance with aspects of the present disclosure.

FIG. 6 shows a flowchart illustrating a method 600 that supports an ultra-low cost high performance satellite aperture in accordance with aspects of the present disclosure. The operations of method 600 may be implemented by an antenna system or its components as described herein. For example, the operations of method 600 may be performed by an antenna system as described with reference to FIGS. 1 through 5. In some examples, an antenna system may execute a set of instructions to control the functional elements of the communication session delivery system to perform the functions described herein. Additionally or alternatively, a communication session delivery system may perform aspects of the functions described herein using special-purpose hardware.

At 605, the antenna system may receive one or more training signals from a first transmitter via an antenna receiver. The one or more training signals may include an indicator of location information associated with the first transmitter, an indicator of a user beam for the first transmitter, a priority for communications from the first transmitter, or a combination thereof. In some examples, the one or more training signals may be encrypted (e.g., according to a public key associated with a user terminal, a user beam, a group of users, a terminal type, a user type, or a combination thereof). Receiving the training signals may include decrypting the training signals (e.g., according to a private key corresponding to the public key). The operations of 605 may be performed according to the methods described herein. In some examples, aspects of the operations of 605 may be performed by a training processor as described with reference to FIG. 5.

At 610, the antenna system may associate a time of arrival based on the received one or more training signals with a respective antenna element. The operations of 610 may be performed according to the methods described herein. In some examples, aspects of the operations of 610 may be performed by a training processor as described with reference to FIG. 5.

At 615, the antenna system may receive one or more data signals from a second transmitter via an antenna receiver. In some examples, the second transmitter may be the same as the first transmitter. In other examples, the second transmitter may be different from the first transmitter. The operations of 615 may be performed according to the methods described herein. In some examples, aspects of the operations of 615 may be performed by a beam weight processor as described with reference to FIG. 5.

At 620, the antenna system may combine the one or more data signals in accordance with coefficients that were determined with the plurality of antenna elements of the antenna system and their respective time of arrivals. The operations of 620 may be performed according to the methods described herein. In some examples, aspects of the operations of 620 may be performed by a beam weight processor as described with reference to FIG. 5.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An antenna system of a satellite, comprising:
  an antenna receiver;
  a plurality of antenna elements coupled to the antenna receiver via a plurality of respective couplings, wherein the antenna system is packaged for deployment in a compact arrangement of the plurality of respective couplings, and wherein during deployment of the antenna system in space the plurality of antenna elements are spread over an aperture area of the antenna system while respective deployed positions of the plurality of antenna elements within the aperture area are not predetermined;
  a training processor configured to:
    receive one or more first signals from the antenna receiver associated with one or more training signals from a first transmitter, and
    associate each of the plurality of antenna elements with a first respective time of arrival based at least in part on the one or more training signals; and
  a beam weight processor configured to combine one or more second signals associated with a data signal from a second transmitter received via the antenna receiver according to a plurality of coefficients determined based at least in part on associations between the plurality of antenna elements and the first respective time of arrivals.

2. The antenna system of claim 1, wherein the plurality of antenna elements are each directly attached to a respective coupling.

3. The antenna system of claim 1, wherein the plurality of antenna elements are each attached to a respective coupling via a coupler.

4. The antenna system of claim 1, wherein each of the plurality of couplings is constructed of a semi-rigid material.

5. The antenna system of claim 1, wherein the deployed positions of the plurality of antenna elements form a volumetric shape.

6. The antenna system of claim 1, wherein the plurality of couplings between the antenna receiver and the plurality of antenna elements are each comprised of a plurality of segments including a first segment type and a second segment type, wherein a segment of the first segment type is coupled to one or more segments of the second segment type.

7. The antenna system of claim 6, wherein each segment of the plurality of segments of the second segment type is coupled to one or more respective antenna elements of the plurality of antenna elements.

8. The antenna system of claim 6, wherein each segment of the plurality of segments of the second segment type is separated from one another by a minimum distance.

9. The antenna system of claim 8, wherein the minimum distance is maintained utilizing one or more mechanical devices.

10. The antenna system of claim 6, wherein each segment of the plurality of segments of the second segment type is coupled to a same quantity of antenna elements.

11. The antenna system of claim 1, wherein during the deployment of the antenna system in space positions of the plurality of antenna elements are not controlled.

12. A method for receiving radio waves at an antenna system of a satellite, comprising:
  receiving one or more first signals using a plurality of antenna elements, the one or more first signals corresponding to a training signal transmitted by a first transmitter, wherein the plurality of antenna elements are coupled to an antenna receiver via a plurality of respective couplings, wherein the antenna system is packaged for deployment in a compact arrangement of the plurality of respective couplings, and wherein during deployment of the antenna system in space the plurality of antenna elements are spread over an aperture area of the antenna system while respective deployed positions of the plurality of antenna elements within the aperture area are not predetermined;
  associating each of the plurality of antenna elements with a first respective time of arrival based at least in part on the one or more first signals;
  receiving one or more second signals using the plurality of antenna elements, the one or more second signals corresponding to a data signal transmitted by a second transmitter; and
  combining the one or more second signals according to a plurality of coefficients determined based at least in part on associations between the plurality of antenna elements and the first respective time of arrivals.

13. The method of claim 12, wherein the plurality of antenna elements are each directly attached to a respective coupling.

14. The method of claim 12, wherein the plurality of antenna elements are each attached to a respective coupling via a coupler.

15. The method of claim 12, wherein each of the plurality of couplings is constructed of a semi-rigid material.

16. The method of claim 12, wherein the deployed positions of the plurality of antenna elements form a volumetric shape.

17. The method of claim 12, wherein the plurality of couplings between the antenna receiver and the plurality of antenna elements are each comprised of a plurality of segments including a first segment type and a second segment type, wherein a segment of the first segment type is coupled to one or more segments of the second segment type.

18. The method of claim 17, wherein each segment of the plurality of segments of the second segment type is coupled to one or more respective antenna elements of the plurality of antenna elements.

19. The method of claim 17, wherein each segment of the plurality of segments of the second segment type is separated from one another by a minimum distance.

20. The method of claim 19, wherein the minimum distance is maintained utilizing one or more mechanical devices.

21. The method of claim 17, wherein each segment of the plurality of segments of the second segment type is coupled to a same quantity of antenna elements.

22. The method of claim 12, wherein during the deployment of the antenna system in space positions of the plurality of antenna elements are not controlled.

23. The antenna system of claim 9, wherein the one or more mechanical devices comprise one or more of: a semi-rigid member, an inflatable structure, an ejectable weighted object, a flexible coupling, a ratchet, a pawl, a chemically hardened member, a thermally-expandable member, a reaction jet, a pyrotechnic device, or an ion thruster.

24. The method of claim 20, wherein during the one or more mechanical devices comprise one or more of: a semi-rigid member, an inflatable structure, an ejectable weighted object, a flexible coupling, a ratchet, a pawl, a chemically hardened member, a thermally-expanded member, a reaction jet, a pyrotechnic device, or an ion thruster.

\* \* \* \* \*